(12) United States Patent
Park et al.

(10) Patent No.: US 10,119,484 B2
(45) Date of Patent: Nov. 6, 2018

(54) APPARATUS FOR RETRIEVING EXHAUST HEAT OF ENGINE AND METHOD FOR CONTROLLING ENGINE USING THE SAME

(71) Applicant: Hyundai Motor Company, Seoul (KR)

(72) Inventors: Jungjoo Park, Gunpo-si (KR); Han Sang Kim, Ansan-si (KR); Min Sub Kim, Incheon (KR)

(73) Assignee: Hyundai Motor Company, Seoul (KR)

( * ) Notice: Subject to any disclaimer, the term of this patent is extended or adjusted under 35 U.S.C. 154(b) by 210 days.

(21) Appl. No.: 15/298,576

(22) Filed: Oct. 20, 2016

(65) Prior Publication Data

US 2017/0314484 A1 Nov. 2, 2017

(30) Foreign Application Priority Data

Apr. 29, 2016 (KR) ........................ 10-2016-0053114

(51) Int. Cl.
*F02D 41/00* (2006.01)
*F02D 41/06* (2006.01)
(Continued)

(52) U.S. Cl.
CPC ............ *F02D 41/0077* (2013.01); *F01P 3/20* (2013.01); *F02B 29/0443* (2013.01);
(Continued)

(58) Field of Classification Search
CPC ........ F02M 25/07; F02M 26/28; F02M 26/32; F02M 26/30; F02D 41/064; F02D 41/068; F02D 41/0077
See application file for complete search history.

(56) References Cited

U.S. PATENT DOCUMENTS

| 9,689,295 | B1 * | 6/2017 | Uhrich | .................. F02M 26/33 |
| 2010/0199664 | A1 * | 8/2010 | Oberlechner | ............. F01N 5/02 60/599 |

(Continued)

FOREIGN PATENT DOCUMENTS

| JP | 2009-138615 A | 6/2009 |
| JP | 2013-036338 A | 2/2013 |

(Continued)

*Primary Examiner* — Thai Ba Trieu
*Assistant Examiner* — Jessica Kebea
(74) *Attorney, Agent, or Firm* — Morgan, Lewis & Bockius LLP

(57) ABSTRACT

An apparatus for retrieving exhaust heat of an engine, may include the engine including a plurality of combustion chambers, an intake line, an exhaust line, a turbocharger including, a turbine provided on the exhaust line, and a compressor provided on the intake line and compressing external air, an exhaust gas recirculation (EGR) apparatus including an EGR line branched from the exhaust line at a rear end of the turbocharger and merged with the intake line, an EGR cooler disposed on the EGR line, and an EGR valve to adjust an amount of re-circulated exhaust gas, an intercooler to cool the intake gas introduced through the intake line, an intercooler cooling line passing through a radiator and the intercooler, an EGR cooling line passing through the radiator and the EGR cooler, an EGR exhaust line, and an exhaust adjusting valve disposed on the EGR exhaust line.

7 Claims, 7 Drawing Sheets

(51) Int. Cl.
  *F02M 26/06* (2016.01)
  *F02M 26/28* (2016.01)
  *F01P 3/20* (2006.01)
  *F02B 29/04* (2006.01)

(52) U.S. Cl.
  CPC ......... *F02D 41/005* (2013.01); *F02D 41/064* (2013.01); *F02D 41/068* (2013.01); *F02M 26/06* (2016.02); *F02M 26/28* (2016.02); *F01P 2060/02* (2013.01); *F02D 2200/021* (2013.01); *Y02T 10/146* (2013.01)

(56) References Cited

U.S. PATENT DOCUMENTS

| | | | |
|---|---|---|---|
| 2011/0088672 A1* | 4/2011 | Prior | F01N 5/02 123/568.12 |
| 2012/0067332 A1* | 3/2012 | Wu | F02B 29/0412 123/568.12 |
| 2015/0121846 A1* | 5/2015 | Hodebourg | F01N 5/02 60/273 |
| 2016/0146162 A1* | 5/2016 | Janke | F28D 7/0075 123/568.12 |
| 2017/0198664 A1* | 7/2017 | Bramson | F02D 41/0065 |
| 2018/0119624 A1* | 5/2018 | Schwartz | F02M 26/14 |

FOREIGN PATENT DOCUMENTS

| | | |
|---|---|---|
| KR | 10-2004-0015582 A | 2/2004 |
| KR | 10-2009-0051556 A | 5/2009 |
| KR | 10-2015-0074343 A | 7/2015 |

\* cited by examiner

APPARATUS FOR RETRIEVING EXHAUST HEAT OF ENGINE AND METHOD FOR CONTROLLING ENGINE USING THE SAME

CROSS-REFERENCE TO RELATED APPLICATION

The present application claims priority to Korean Patent Application No. 10-2016-0053114, filed Apr. 29, 2016, the entire contents of which is incorporated herein for all purposes by this reference.

BACKGROUND OF THE INVENTION

Field of the Invention

The present invention relates to an apparatus for retrieving exhaust heat of an engine and a method for controlling an engine using the same. More particularly, to an apparatus for retrieving exhaust heat of an engine and a method for controlling an engine using the same capable of rapidly increasing a temperature of a coolant of the engine at the time of cold start of the engine.

Description of Related Art

Generally, some of heat generated in a combustion chamber of an engine is transferred to a cylinder head, a cylinder block, a piston, and the like.

When a temperature of these components is excessively increased, thermal deformation is generated in the respective components formed of a metal material or an oil film of a cylinder inner wall is damaged, such that a thermal fault that a lubrication action between the piston and the cylinder block is deteriorated occurs.

This thermal fault phenomenon of the engine generates abnormal combustion such as a combustion defect, knocking, pre-ignition, or the like, of the engine, decreases thermal efficiency, and decreases an output of the engine.

To the contrary, when a temperature of a coolant of the engine is excessively decreased, an output of the engine and fuel consumption are decreased. Therefore, there is a need to appropriately control the temperature of the coolant.

Particularly, at the time of cold start of the engine such as winter, viscosity of engine oil is increased, such that an output and efficiency of the engine are decreased, thereby decreasing fuel consumption. In addition, since a temperature of the combustion chamber is low, an excessive amount of exhaust gas is emitted due to incomplete combustion.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for retrieving exhaust heat of an engine and a method for controlling an engine using the same having advantages of rapidly increasing a temperature of a coolant of the engine at the time of cold start of the engine.

Further, various aspects of the present invention are directed to providing an apparatus for retrieving exhaust heat of an engine and a method for controlling an engine using the same having advantages of improving fuel consumption of a vehicle by rapidly increasing a temperature of a coolant of the engine at the time of cold start of the engine.

According to various aspects of the present invention, an apparatus for retrieving exhaust heat of an engine may include the engine including a plurality of combustion chambers generating driving force by combustion of fuel, an intake line into which intake gas supplied to the combustion chambers is introduced, an exhaust line through which exhaust gas exhausted from the combustion chambers flows, a turbocharger including a turbine provided on the exhaust line and rotated by the exhaust gas exhausted from the combustion chambers, and a compressor provided on the intake line, rotated together with the turbine, and compressing external air, an exhaust gas recirculation (EGR) apparatus including an EGR line branched from the exhaust line at a rear end of the turbocharger and merged with the intake line, an EGR cooler disposed on the EGR line to cool the exhaust gas flowing through the EGR line, and an EGR valve to adjust an amount of re-circulated exhaust gas, an intercooler to cool the intake gas introduced through the intake line, an intercooler cooling line passing through a radiator and the intercooler, an EGR cooling line passing through the radiator and the EGR cooler, an EGR exhaust line branched from the exhaust line and passing through the EGR cooler, and an exhaust adjusting valve disposed on the EGR exhaust line and adjusting an amount of exhaust gas passing through the EGR cooler.

The apparatus for retrieving exhaust heat of the engine may further include a controller to adjust an open amount of the exhaust adjusting valve and an open amount of the EGR valve depending on a temperature of the coolant.

When the temperature of the coolant is lower than a predetermined temperature, the controller may open the exhaust adjusting valve and close the EGR valve so that heat exchange between the exhaust gas and the coolant of the engine occurs in the EGR cooler.

When the temperature of the coolant is the predetermined temperature or more, the controller may close the exhaust adjusting valve and adjust the open amount of the EGR valve.

According to various aspects of the present invention, a method for controlling an engine including a cooling line including an intercooler cooling line passing through a radiator and an intercooler and an EGR cooling line passing through the radiator and an EGR cooler of an EGR apparatus, an EGR exhaust line branched from an exhaust line of the engine and passing through the EGR cooler, and an exhaust adjusting valve disposed on the EGR exhaust line, may include detecting, by a temperature sensor, a temperature of a coolant flowing through the cooling line, comparing, by a controller, the temperature of the coolant with a predetermined temperature, and adjusting, by the controller, open amounts of the exhaust adjusting valve and an EGR valve to adjust an amount of exhaust gas re-circulated by the EGR apparatus depending on the temperature of the coolant.

When the temperature of the coolant is lower than the predetermined temperature, the exhaust adjusting valve may be opened, and the EGR valve may be closed by the controller.

When the temperature of the coolant is the predetermined temperature or more, the exhaust adjusting valve may be closed, and the open amount of the EGR valve may be adjusted by the controller.

As described above, in the apparatus for retrieving exhaust heat of an engine 10 and the method for controlling the engine using the same according to various embodiments of the present invention, at the time of the cold start of the engine, a low-temperature coolant is heated by heat exchange with high-temperature exhaust gas in the EGR cooler, thereby making it possible to minimize a warm-up time of the engine.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
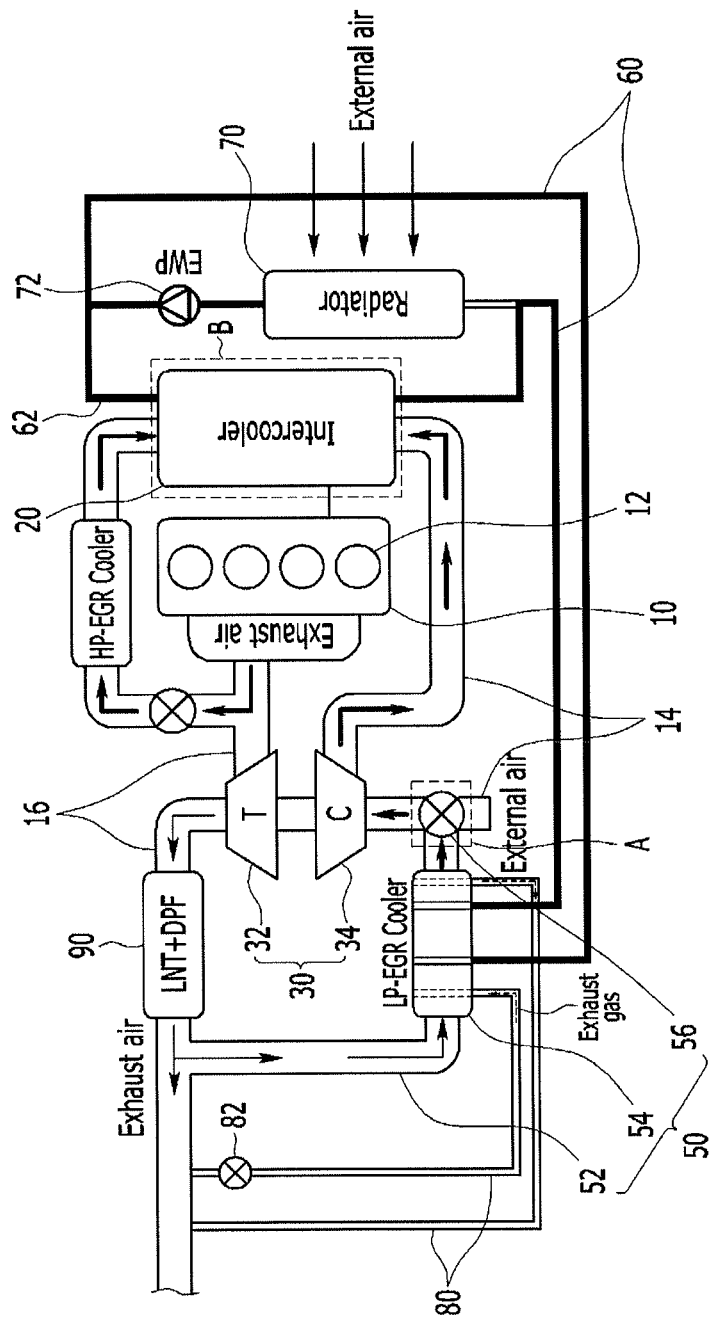
FIG. 1 is a schematic view showing a configuration of an apparatus for retrieving exhaust heat of an engine according to various embodiments of the present invention.
Figure 5:
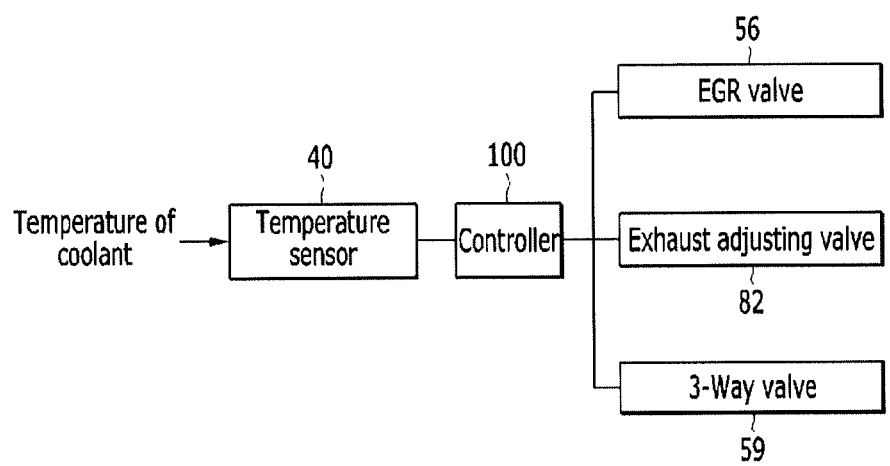
FIG. 5 is a block diagram showing a configuration of an apparatus for retrieving exhaust heat of an engine according to various embodiments of the present invention.

FIG. 1 is a schematic view showing a configuration of an apparatus for retrieving exhaust heat of an engine according to various embodiments of the present invention. FIG. 5 is a block diagram showing a configuration of an apparatus for retrieving exhaust heat of an engine according to various embodiments of the present invention.

As shown in FIG. 1, the apparatus for retrieving exhaust heat of an engine according to various embodiments of the present invention includes an engine 10, a turbocharger 30, an exhaust gas recirculation (EGR) apparatus 50, an intercooler 20, and a cooling line.

The engine 10 includes a plurality of combustion chambers 12 generating driving force by combustion of fuel. The engine 10 is provided with an intake line 14 through which intake gas supplied to the combustion chambers flows, and an exhaust line 16 through which exhaust gas exhausted from the combustion chambers 12 flows.

The exhaust line 16 is provided with an exhaust gas purifying apparatus 90 purifying various harmful materials contained in the exhaust gas exhausted from the combustion chambers 12. The exhaust gas purifying apparatus 90 may include a lean NOx trap (LNT) for purifying nitrogen oxide, a diesel oxidation catalyst, and a diesel particulate filter.

The turbocharger 30 compresses the intake gas (external air+recirculation gas) introduced through the intake line, and supplies the compressed intake gas to the combustion chambers 12. The turbocharger 30 includes a turbine 32 provided on the exhaust line 16 and rotated by the exhaust gas exhausted from the combustion chambers 12 and a compressor 34 rotated together with the turbine 12 and compressing the intake gas.

The EGR apparatus (a low pressure exhaust gas recirculation (LP-EGR) apparatus) 50 includes an EGR line 52, an EGR cooler 54, and an EGR valve 56.

The EGR line 52 is branched from the exhaust line 16 of a rear end of the turbocharger 30, and is merged with the intake line 14. The EGR cooler 54 is disposed on the EGR line 52, and cools the exhaust gas flowing through the EGR line 52. The EGR valve 56 is disposed at a point at which the EGR line 52 and the intake line 14 are merged with each other, and adjusts an amount of exhaust gas introduced into the intake line 14.

The intercooler 20 cools the intake gas introduced through the intake line 14. The intercooler 20 may be a water cooling type intercooler cooling the intake gas through heat exchange with a coolant.

The water cooling type intercooler 20 may be implemented in various forms, but an intake manifold integrated water cooling type intercooler 20 formed integrally with an intake manifold will be described as an example of the water cooling type intercooler 20 in various embodiments of the present invention.

A radiator 70 cools the engine 10 through heat exchange with air introduced from the outside to cool a coolant that becomes hot. The radiator 70 is disposed on the cooling line.

The cooling circuit includes an intercooler cooling line 62 passing through the water cooling type intercooler 20, an EGR cooling line 60 passing through the EGR cooler 54, and a radiator cooling line passing through the radiator 70.

The EGR cooling line 60 and the intercooler cooling line 62 are partially overlapped with each other, and the radiator 70 and an electric water pump are disposed at a portion at which the EGR cooling line 60 and the intercooler cooling line 62 are overlapped with each other. The electric water pump (EWP) is operated by a motor to pump the coolant flowing through the cooling line.

The coolant flowing through the intercooler cooling line 62 heat-exchanges with the intake gas flowing through the intake line 14 in the intercooler 20 to cool the intake gas. In addition, the coolant flowing through the intercooler cooling line 62 cools the engine that becomes hot by combustion of fuel.

Meanwhile, the apparatus for retrieving exhaust heat of an engine 10 according to various embodiments of the present invention includes an exhaust heating line 80 branched from the exhaust line 16 and passing through the EGR cooler 54, and an exhaust adjusting valve 82 installed on the exhaust heating line 80 and adjusting an amount of exhaust gas passing through the EGR cooler 54. The exhaust heating line 80 is branched from a one side of the exhaust line 16 and joined to the other side of the exhaust line 16.

Figure 2:
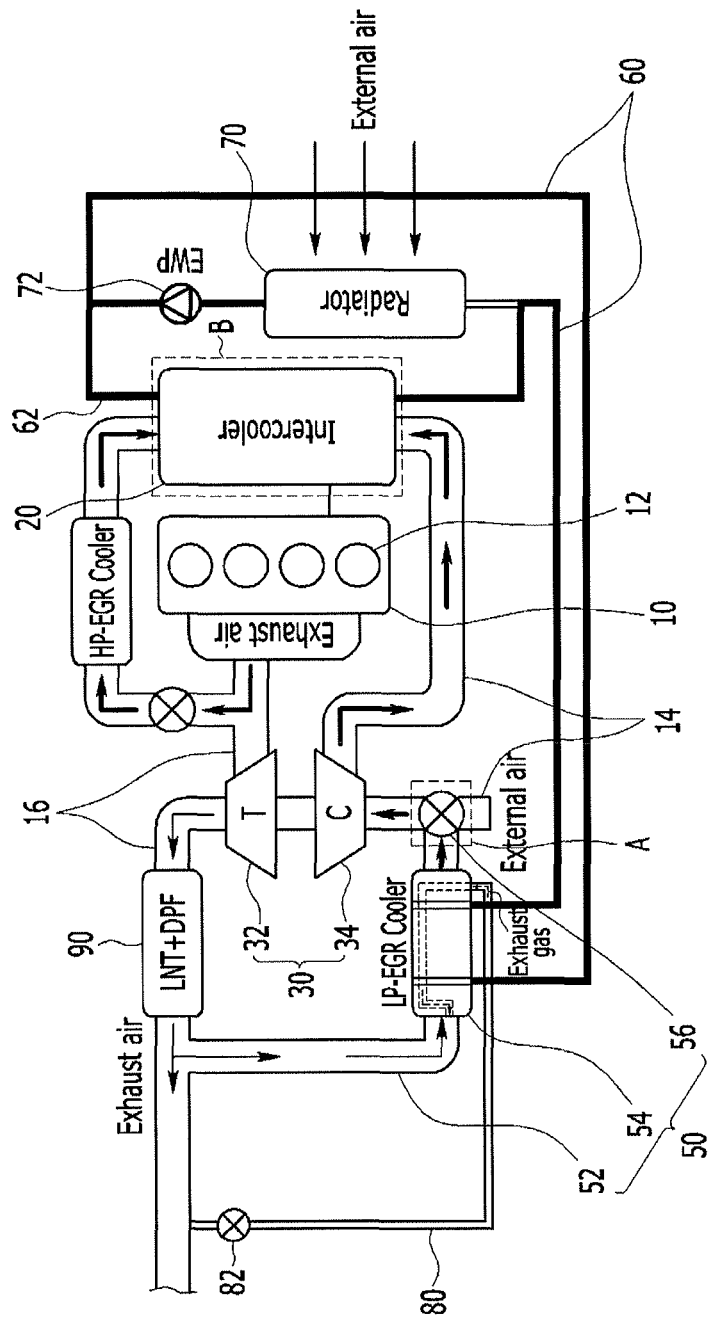
FIG. 2 is a schematic view showing a configuration of an apparatus for retrieving exhaust heat of an engine according to various embodiments of the present invention.

As shown in FIG. 2, the apparatus for retrieving exhaust heat of an engine 10 according to various embodiments of the present invention may include an exhaust heating line 80' branched from the exhaust line 16 and joined to the EGR line 52 passing through the EGR cooler 54, and an exhaust adjusting valve 82' installed on the exhaust heating line 80 and adjusting an amount of exhaust gas passing through the EGR cooler 54. That is, the exhaust heating line 80 is branched from the exhaust line 16 and joined to the EGR line 52.

In the EGR cooler 54, heat is exchanged between the exhaust gas flowing through the exhaust line 80 and 80' and the coolant flowing through the EGR cooling line 60. Therefore, the coolant flowing through the EGR cooling line 60 is heated by high-temperature exhaust gas flowing through the exhaust heating line 80 and 80'.

A controller 100 adjusts open amounts of the EGR valve 56 and the exhaust adjusting valve 82 and 82' depending on a temperature of the coolant.

The controller 100 may be at least one processor operated by a predetermined program, and the predetermined program is configured to perform each step of a method for controlling an engine according to various embodiments of the present invention.

When the temperature of the coolant is lower than a predetermined temperature (for example, at the time of cold start of the engine), the controller 100 opens the exhaust adjusting valve 82 and 82' and closes the EGR valve 56 so that heat exchange between the exhaust gas and the coolant of the engine is made in the EGR cooler 54

That is, at the time of the cold start of the engine 10, the controller 100 opens the exhaust adjusting valve 82 and 82' to allow the exhaust gas to flow to the EGR cooler 54, and closes the EGR valve 56 to block a flow of the exhaust gas re-circulated to the EGR line 52.

Therefore, in the EGR cooler 54, high-temperature exhaust gas flowing through the exhaust heating line 80 and 80' heats a cold coolant flowing through the EGR cooling line 60. Therefore, a temperature of the coolant is rapidly increased, and the heated coolant is supplied to the engine 10, thereby making it possible to improve fuel consumption of a vehicle.

Meanwhile, when the temperature of the coolant is a predetermined temperature or more, the controller 100 decides that warm-up of the engine 10 is completed. In addition, the controller 100 closes the exhaust adjusting valve 82 and 82', and adjusts an open amount of the EGR valve 56 in order to adjust an amount of exhaust gas re-circulated through the EGR apparatus 50 depending on a driving state of the engine 10.

Meanwhile, the EGR valve 56 and the exhaust adjusting valve 82 may be realized as one valve.

Figure 3:
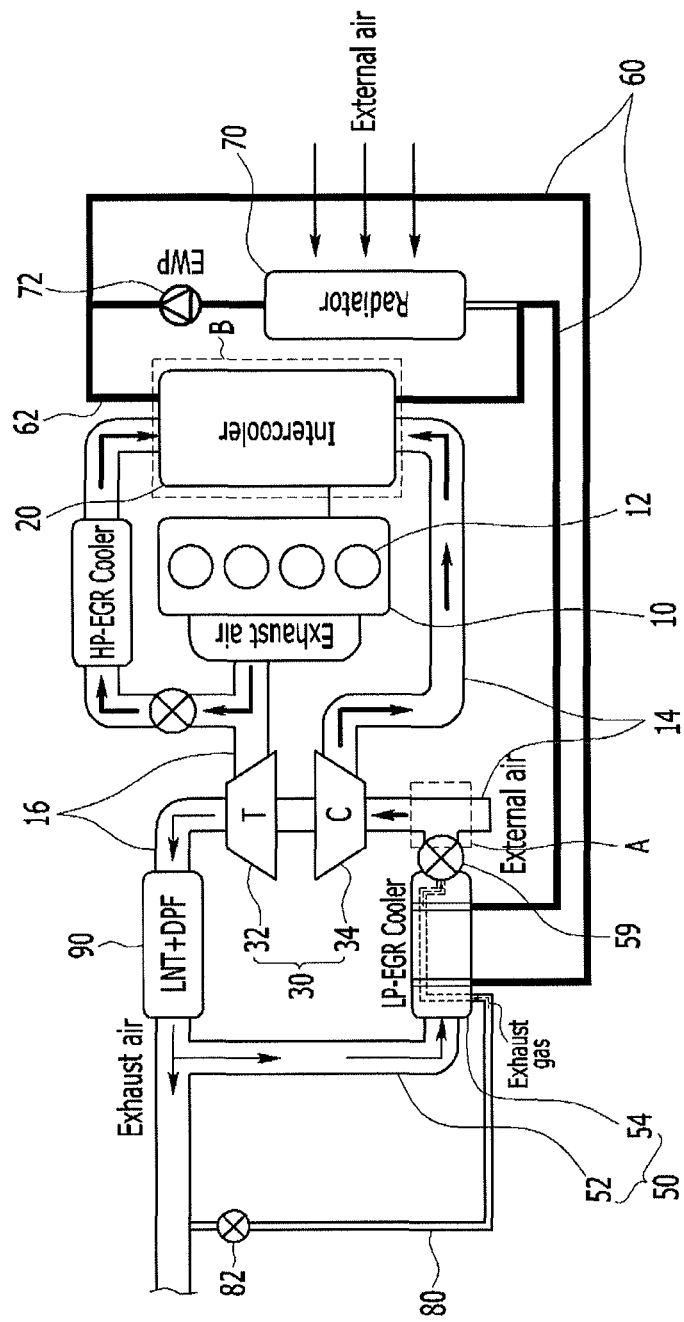
FIG. 3 is a schematic view showing a configuration of an apparatus for retrieving exhaust heat of an engine according to various embodiments of the present invention.
Figure 4A:
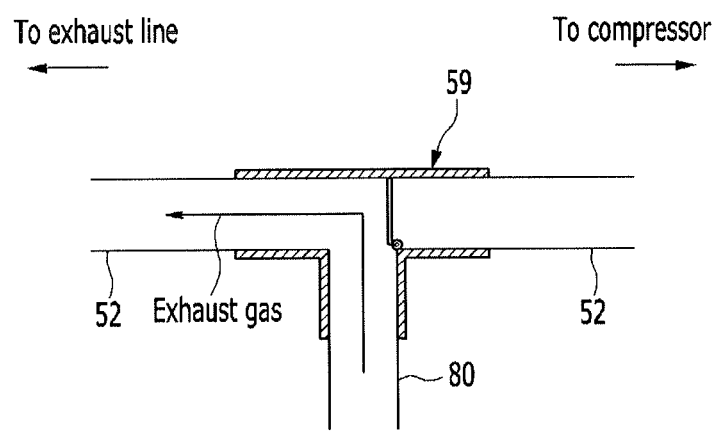
FIG. 4A and FIG. 4B are a schematic view showing a 3-way valve according to various embodiments of the present invention.
Figure 4B:
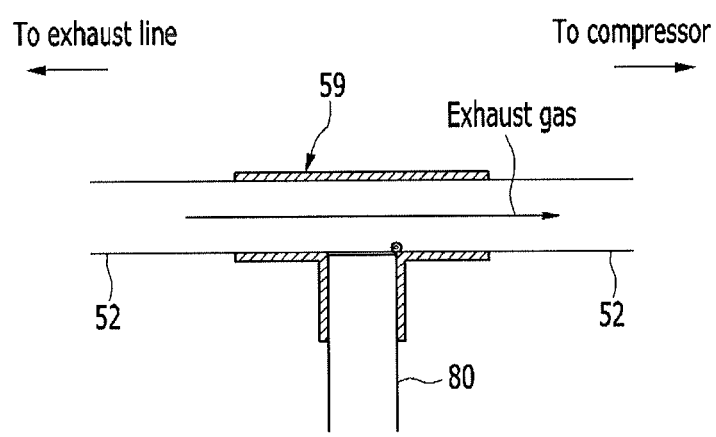

FIG. 3 is a schematic view showing a configuration of an apparatus for retrieving exhaust heat of an engine according various embodiments of the present invention. FIGS. 4A and 4B are a schematic view showing a 3-way valve according to various embodiments of the present invention.

Referring to FIGS. 3 and 4, the apparatus for retrieving exhaust heat of an engine is the same as the apparatus for retrieving exhaust heat of an engine of FIG. 2, except for the EGR valve and the exhaust adjusting valve 82 are realized as a 3-way valve.

Referring to FIGS. 3 and 4, the apparatus for retrieving exhaust heat of an engine includes a 3-way valve 59 disposed at the EGR cooler 54. The 3-way valve is operated by a control signal of the controller 100.

In detail, referring to FIG. 4A, when the temperature of the coolant is lower than the predetermined temperature, the controller 100 controls that the exhaust heating line 80 communicates with the exhaust line 16 by controlling the 3-way valve. Therefore, the exhaust gas flowing through the exhaust heating line 80 and having high temperature rapidly heats the coolant flowing through the exhaust line 60.

Meanwhile, referring to FIG. 4B, when the temperature of the coolant Is the predetermined temperature or more, the controller 100 controls so that the exhaust does not flow from the exhaust heating line 80 to the exhaust line 16 by controlling the 3-way valve 59, and the exhaust gas flows from the exhaust line 16 to the compressor 34 through the EGR line 52. Therefore, the exhaust gas flowing through the exhaust line 16 is supplied to the combustion chamber 12 through the EGR line 52 and the compressor 34.

Hereinafter, a method for controlling an engine according to various embodiments of the present invention will be described in detail with reference to the accompanying drawings.

Figure 6:
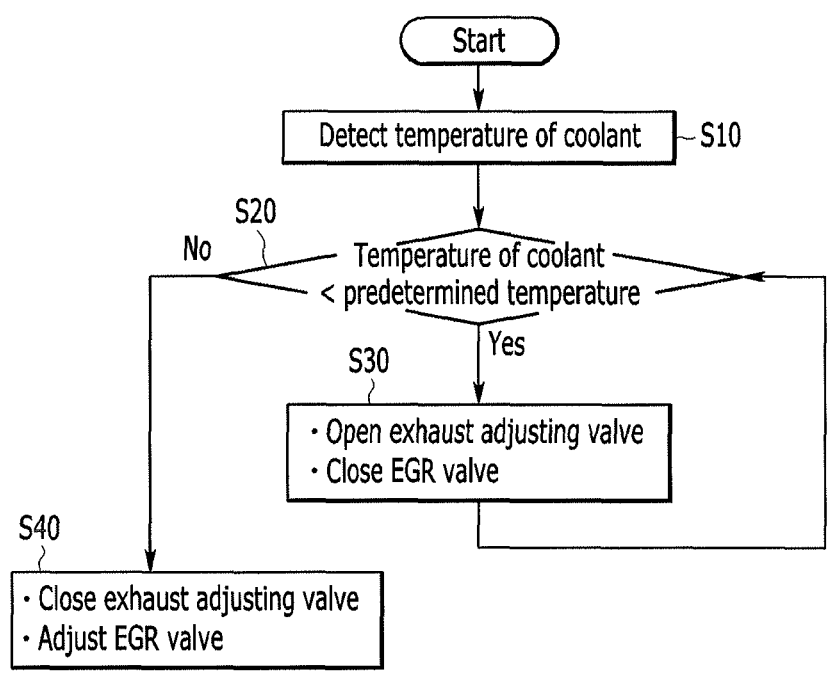
FIG. 6 is a flow chart showing a method for controlling an engine according to various embodiments of the present invention.

FIG. 6 is a flow chart showing a method for controlling an engine according to various embodiments of the present invention.

As shown in FIG. 6, the temperature of the coolant is detected by a temperature sensor 40 (S10). The temperature of the coolant detected by the temperature sensor 40 is transmitted to the controller 100.

The controller 100 adjusts the open amounts of the exhaust adjusting valve 82 and 82' and the EGR valve 56 depending on the temperature of the coolant.

In detail, the controller 100 compares the temperature of the coolant and a predetermined temperature with each other (S20).

When the temperature of the coolant is lower than the predetermined temperature, the controller 100 opens the exhaust adjusting valve 82 and 82' and closes the EGR valve 56 (S30).

As described above, the controller 100 opens the exhaust adjusting valve 82 and 82' to allow high-temperature exhaust gas to flow to the exhaust heating line 80 and 80', and closes the EGR valve 56 to block a flow of the exhaust gas re-circulated to the EGR line 52.

Therefore, in the EGR cooler 54, high-temperature exhaust gas flowing through exhaust heating line 80 and 80' heats a cold coolant flowing through the EGR cooling line 60. Therefore, the temperature of the coolant is rapidly increased, and the heated coolant is supplied to the engine 10, such that fuel consumption of a vehicle is improved.

At this time, according to the apparatus for retrieving exhaust heat of FIG. 1, the exhaust gas flowing through the exhaust heating line 80 is exhausted to outside through the exhaust line 16 after passing through the EGR cooler 54.

According to the apparatus for retrieving exhaust heat of FIG. 2, the exhaust gas flowing through the exhaust heating line 80' is exhausted to outside through the EGR line 52 and the exhaust line 16 after passing through the EGR cooler 54.

After S30, the controller 100 continuously monitors the temperature of the coolant to decide whether or not the temperature of the coolant is the predetermined temperature or more (S20).

When the temperature of the coolant is the predetermined temperature or more, the controller 100 closes the exhaust adjusting valve 82 and 82', and adjusts the open amount of the EGR valve 56 (S40).

As described above, in the apparatus for retrieving exhaust heat of an engine 10 and the method for controlling an engine using the same according to various embodiments of the present invention, at the time of the cold start of the engine, a low-temperature coolant is heated by heat exchange with high-temperature exhaust gas in the EGR cooler 54, and the heated coolant is supplied to the engine. Therefore, a warm-up time of the engine is minimized, thereby making it possible to improve fuel consumption of a vehicle.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for retrieving exhaust heat of an engine, comprising: the engine including a plurality of combustion chambers generating driving force by combustion of fuel;
   an intake line into which intake gas supplied to the plurality of combustion chambers is introduced;
   an exhaust line through which exhaust gas exhausted from the plurality of combustion chambers flows;
   a turbocharger including:
   a turbine provided on the exhaust line and rotated by the exhaust gas exhausted from the plurality of combustion chambers; and
   a compressor provided on the intake line, rotated together with the turbine, and compressing external air;
   an exhaust gas recirculation (EGR) apparatus including:
   an EGR line branched from the exhaust line downstream of the turbine and merged with the intake line;
   an EGR cooler disposed on the EGR line to cool the exhaust gas flowing through the EGR line; and
   an EGR valve to adjust an amount of re-circulated exhaust gas;
   an intercooler to cool the intake gas introduced through the intake line;
   a coolant circuit circulating a coolant through the engine, an intercooler, a radiator, and the EGR cooler;
   a sensor detecting a coolant temperature of the coolant circuit;
   an exhaust heating line branched from the exhaust line which passes through the EGR cooler and rejoins with the exhaust line; and
   an exhaust adjusting valve disposed on the exhaust heating line which adjusts an amount of exhaust gas in the exhaust heating line passing through the EGR cooler.

2. The apparatus for retrieving exhaust heat of the engine of claim 1, further comprising a controller to adjust an opening degree of the exhaust adjusting valve and an opening degree of the EGR valve depending on the coolant temperature of the coolant circuit.

3. The apparatus for retrieving exhaust heat of the engine of claim 2, wherein when the coolant temperature is lower than a predetermined temperature, the controller opens the exhaust adjusting valve and closes the EGR valve so that heat exchange between the exhaust gas and the coolant of the engine occurs in the EGR cooler.

4. The apparatus for retrieving exhaust heat of the engine of claim 2, wherein when the coolant temperature is the predetermined temperature or more, the controller closes the exhaust adjusting valve and adjusts the opening degree of the EGR valve.

5. A method for controlling an engine including a cooling circuit circulating a coolant through a radiator and an intercooler and an exhaust gas recirculation (EGR) cooler of an EGR apparatus, an exhaust heating line branched from an exhaust line of the engine and passing through the EGR cooler and rejoining with the exhaust line, and an exhaust adjusting valve disposed on the exhaust heating line, the method comprising:
   detecting, by a temperature sensor, a temperature of the coolant flowing through the cooling circuit;
   comparing, by a controller, the temperature of the coolant with a predetermined temperature; and
   adjusting, by the controller, opening degrees of the exhaust adjusting valve and an EGR valve to adjust an amount of exhaust gas re-circulated by the EGR apparatus depending on the temperature of the coolant.

6. The method for controlling the engine of claim 5, wherein when the temperature of the coolant is lower than the predetermined temperature, the exhaust adjusting valve is opened, and the EGR valve is closed by the controller.

7. The method for controlling the engine of claim 5, wherein when the temperature of the coolant is the predetermined temperature or more, the exhaust adjusting valve is closed, and the opening degree of the EGR valve is adjusted by the controller.

* * * * *